(12) United States Patent
Westerlund

(10) Patent No.: US 9,470,300 B2
(45) Date of Patent: Oct. 18, 2016

(54) METHOD AND DEVICE AT A VEHICLE DIFFERENTIAL BRAKE

(71) Applicant: BorgWarner TorqTransfer Systems AB, Landskrona (SE)

(72) Inventor: Niklas Westerlund, Helsingborg (SE)

(73) Assignee: BorgWarner TorqTransfer Systems AB, Landskrona (SE)

( * ) Notice: Subject to any disclaimer, the term of this patent is extended or adjusted under 35 U.S.C. 154(b) by 124 days.

(21) Appl. No.: 14/350,114

(22) PCT Filed: Oct. 25, 2012

(86) PCT No.: PCT/EP2012/071146
§ 371 (c)(1),
(2) Date: Apr. 7, 2014

(87) PCT Pub. No.: WO2013/060775
PCT Pub. Date: May 2, 2013

(65) Prior Publication Data
US 2014/0256492 A1  Sep. 11, 2014

(30) Foreign Application Priority Data

Oct. 25, 2011 (SE) .................................... 1150987

(51) Int. Cl.
*B60K 17/16* (2006.01)
*F16H 48/22* (2006.01)
*F16D 48/06* (2006.01)
*F16H 48/32* (2012.01)
*F16H 48/20* (2012.01)

(52) U.S. Cl.
CPC ............... *F16H 48/22* (2013.01); *B60K 17/20* (2013.01); *F16D 48/066* (2013.01); *F16D 2500/1024* (2013.01); *F16D 2500/10412* (2013.01); *F16D 2500/10425* (2013.01); *F16D 2500/3024* (2013.01); *F16D 2500/3101* (2013.01); *F16D 2500/3109* (2013.01); *F16D 2500/31426* (2013.01); *F16D 2500/5014* (2013.01); *F16D 2500/525* (2013.01); *F16D 2500/7041* (2013.01); *F16D 2500/70406* (2013.01); *F16D 2500/70426* (2013.01); *F16D 2500/70663* (2013.01); *F16H 48/32* (2013.01); *F16H 2048/204* (2013.01)

(58) Field of Classification Search
None
See application file for complete search history.

(56) References Cited

U.S. PATENT DOCUMENTS

| 5,152,362 | A | 10/1992 | Naito |
| 6,543,596 | B2 * | 4/2003 | Martin ................ F16D 25/0638 188/71.5 |
| 2008/0190729 | A1 | 8/2008 | Stehr et al. |

FOREIGN PATENT DOCUMENTS

| EP | 2116410 A1 | 11/2009 |
| JP | H0796765 A | 4/1995 |
| JP | 2008281117 A | 11/2008 |
| WO | 2011043722 A1 | 4/2011 |

OTHER PUBLICATIONS

Japanese Office Action dated Aug. 23, 2016; Application No. 2014537612; Applicant: BorgWarner TorqTransfer Systems AB; 3 pages.

* cited by examiner

*Primary Examiner* — Justin Holmes
(74) *Attorney, Agent, or Firm* — BrooksGroup

(57) ABSTRACT

In a driveline in a front wheel drive vehicle the distribution of drive torque to the drive wheels (1) via a differential (6) is controlled by means of a differential brake with a hydraulically controlled limited slip clutch (7). A low preparatory hydraulic pressure is applied to the clutch at the occurrence of any one of certain predetermined driving situations for decreasing the response time for the clutch.

20 Claims, 2 Drawing Sheets

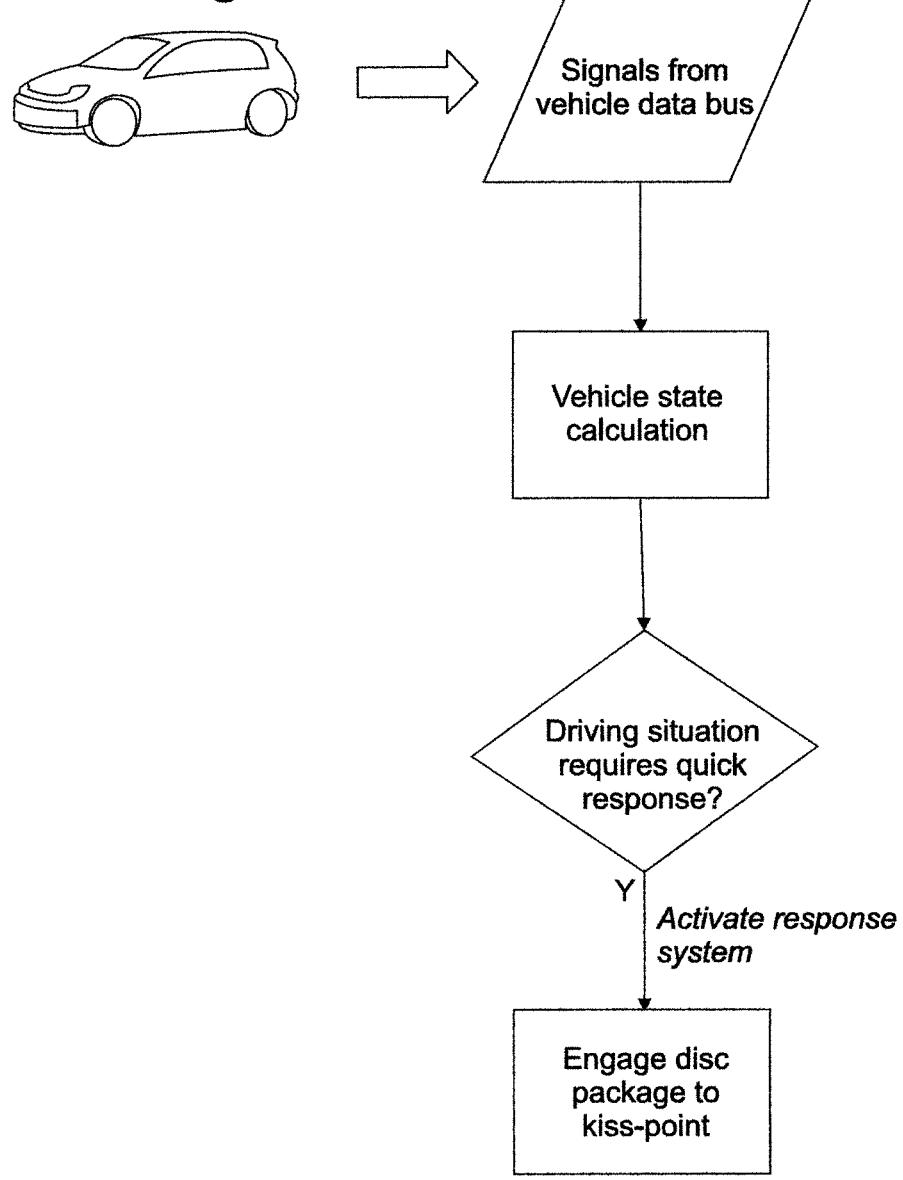

METHOD AND DEVICE AT A VEHICLE DIFFERENTIAL BRAKE

This application claims the benefit of Swedish Application No. 1150987-4 filed Oct. 25, 2011 and PCT Application No. EP2012/071146 filed Oct. 25, 2012.

TECHNICAL FIELD

The present invention relates to a method in a driveline in a vehicle, preferably a front wheel drive vehicle, for controlling the distribution of drive torque to two drive wheels via a differential being provided with a differential brake with a hydraulically controlled limited slip clutch. It also relates to a device for carrying out this method.

BACKGROUND OF THE INVENTION

The differential brake, electronically controlled via the clutch, is only used at certain driving conditions, and it may thus take several minutes or more under normal driving conditions between two consecutive operations thereof. This means that the clutch may return to an "idling" condition (with its clutch discs fully separated from each other) and that the response time, when a controlling torque is needed in the clutch, may be long.

THE INVENTION

The main object of the invention is to remove the drawback with the long response time in certain situations. This is according to the invention attained in that a low preparatory hydraulic pressure is applied to the clutch at the occurrence of any one of certain predetermined driving situations.

This preparatory hydraulic pressure is preferably of a magnitude to bring clutch discs of the clutch in contact with each other but not to influence driving dynamics of the vehicle and may be applied in situations, where a controlling action of the clutch may be envisaged shortly.

The preparatory hydraulic pressure may for example be applied a certain time after the brake pedal of the vehicle is released, or when the vehicle is accelerating while negotiating a sharp curve, or when the steering wheel of the vehicle, running at high speed, is turned.

BRIEF DESCRIPTION OF THE DRAWINGS

The invention will be described in further detail below under reference to the accompanying drawings, in which FIG. 3 is a block diagram to illustrate the invention.

DETAILED DESCRIPTION OF EMBODIMENTS

Figure 1:
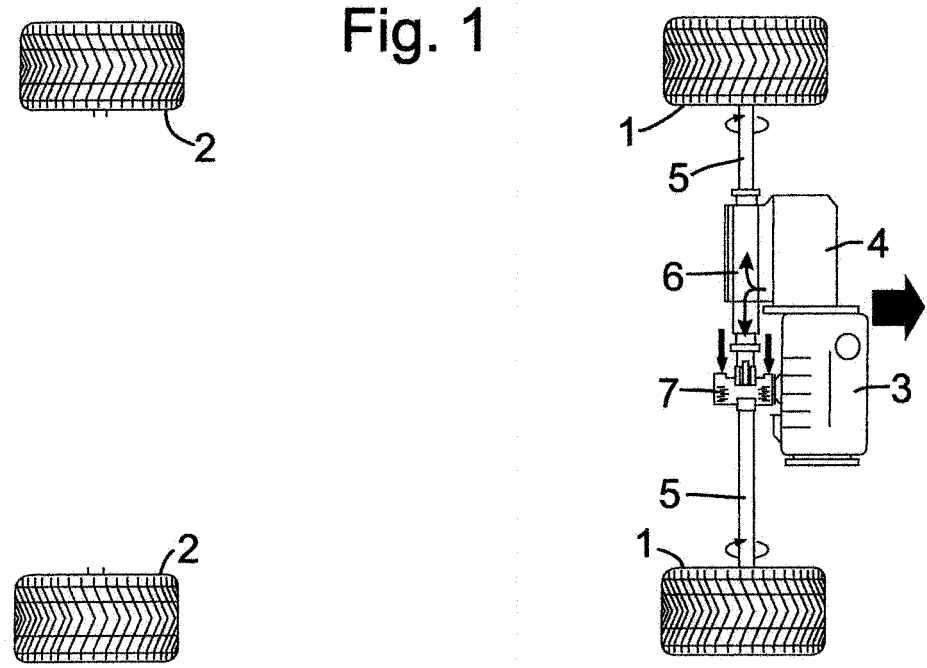
FIG. 1 is a schematic illustration of a driveline layout for a front wheel drive (FWD) road vehicle.

FIG. 1 is a schematic illustration of a driveline layout for a front wheel drive (FWD) road vehicle. The vehicle has two driven front wheels 1 and two undriven rear wheels 2 in a chassis. As is well known to any person skilled in the art, the front wheels 1 are driven by an engine 3 via a gear box 4 and two half-axles 5, connected by means of a conventional differential 6, capable of transmitting torque to the two half-axles 5, which may rotate with different speeds for example at curve negotiation.

At certain situations, the ground grip for one drive wheel 1 may be partially or totally lost, resulting in wheel slip and loss of torque transfer or traction for the other drive wheel. This undesirable effect of the conventional differential may as known be obviated by the provision of a differential brake, which has the effect of partially or totally "short-circuiting" the differential by connecting the two half-axles 5 with each other. A differential brake in the form of a hydraulically controlled, limited slip clutch 7 is illustrated in FIG. 1. By engaging this clutch 7 the speed differential and torque distribution between the two half-axles may be controlled.

Figure 2:
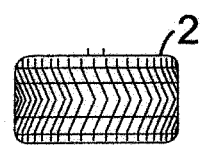
FIG. 2 is an exemplary hydraulic scheme for a control system of a limited clutch in the driveline of FIG. 1.
Figure 2:
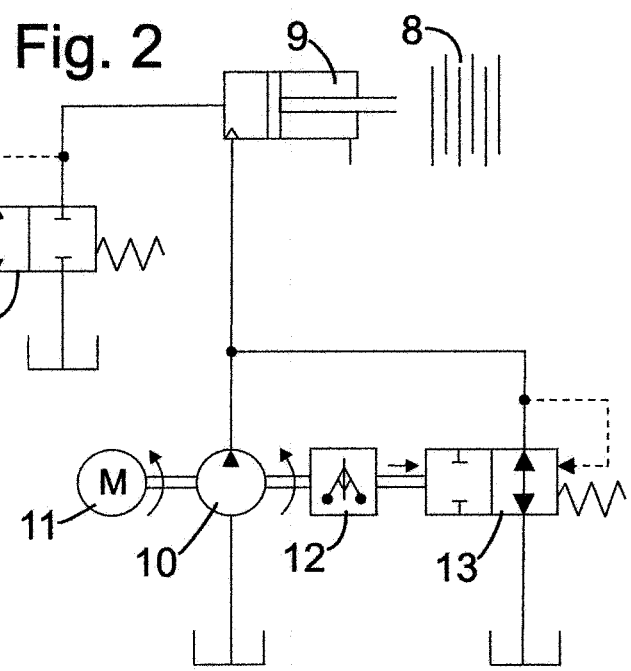

FIG. 2 illustrates a hydraulic control system, which is an example of a system that can be used for controlling multiple discs or a disc package 8 of the limited slip clutch 7. When the discs 8 are brought into engagement with each other by a hydraulic cylinder 9, the clutch 7 is engaged. This hydraulic control system is previously shown and described in detail in WO 2011/043722, to which reference is made. It may herein suffice to note the presence of a hydraulic pump 10 driven by an electric motor 11. On the same shaft as the pump 10 there is a centrifugal regulator 12 controlling the position of a pressure overflow valve 13. The system also contains a relief valve 14.

The motor 11 is constantly running, but its rotational speed is increased for increasing the hydraulic pressure to the cylinder 9 and thus for engaging the multiple discs 8 of the clutch 7. The clutch 7 can be controlled by the system with great accuracy and with reasonably low response time due to the constantly running motor 11. The maximum hydraulic pressure in the system may for example be set at 40 bar.

As already stated, the differential brake in the form of the clutch 7 is only operational under certain circumstances to be dealt with below. Such circumstances may only occur at rather long intervals, such as several minutes or more. This means that the hydraulic control system is "idling" and that the hydraulic pressure therein goes down to nil, so that the multiple discs 8 of the clutch 7 are at maximum distance from each other.

When there is a need for engaging the clutch 7, the time for pressurizing the hydraulic system and compressing the multiple discs 8 may be in the order of >250 ms, which may be too much in this use for controlling a differential brake.

A solution to the problem with too long response times may according to the invention be to apply a certain low preparatory hydraulic pressure in the cylinder 9, when certain predetermined driving situations occur. Such driving situations may be detected by existing means in the vehicle, and the processing for applying this pressure may be handled by the ordinary electronic control system for the differential brake.

The preparatory hydraulic pressure shall be so low that the driving dynamics of the vehicle are not influenced, but still high enough for applying the discs of the multiple discs 8 against each other or in other words for reaching a "kiss-point" for the disc package. At a maximum hydraulic pressure in the system of 40 bar, the preparatory pressure may for example be in the order of 1 bar. The use of the preparatory hydraulic pressure may drastically improve the response time after an "idling" interval.

The software of the electronic control system for the differential brake may in one version contain three main areas: pre-load, slip-control and yaw-damping.

The pre-load area of the software may engage or lock the clutch 7, when the vehicle is to be started from a standstill.

This is a preventive measure to avoid loosing the grip for any of the driving wheels, having a poorer grip on the ground than the other.

The slip-control will apply a torque on the clutch 7 at the occurrence of a decreased grip for one of the driving wheels during operation.

The yaw-damping will apply a torque on the clutch 7, when over-steering of the vehicle occurs, and tends to right or stabilize the vehicle.

In this environment and only to be seen as examples of uses, the preparatory hydraulic pressure may be applied by an electronic response system in the following driving situations requiring quicker response times than may be provided without the preparatory hydraulic pressure.

The vehicle holds at red light, and the driver has the foot brake applied. When the brake pedal is released, the preparatory hydraulic pressure is applied for say 2 seconds for improving the response time for the pre-load to possibly come. If the pre-load is not used within this time period, it has to be assumed that the preparatory hydraulic pressure is not needed, because the driver did not plan a quick start.

A sharp curve is negotiated during acceleration. The gas pedal position in combination with the high lateral acceleration indicates that the inner drive wheel may loose its grip and start spinning. The preparatory hydraulic pressure is applied for decreasing the response time if needed for the slip-control torque.

The steering wheel is turned somewhat, when the vehicle is running at high speed. This indicates that a yaw-damping may be needed, and the preparatory hydraulic pressure is applied.

It shall be noted that other driving situations where the quick response of the clutch 7 may be required are possible. Also, it is important to note that the invention is not limited to its use with the shown and described clutch and its control system.

FIG. 3 is a block diagram illustrating the invention. A data bus in a modern vehicle contains detailed information about the vehicle and its behavior during driving. The vehicle state is thus constantly calculated. If a predetermined driving situation requiring a quick response from the clutch 7 occurs, the response system controls the application of the preparatory hydraulic pressure for engaging the disc package 8 to the "kiss-point".

The invention has been shown and described in its use for a front wheel drive vehicle, but its basic ideas are equally applicable to a rear wheel drive vehicle.

Modifications are possible within the scope of the appended claims.

The invention claimed is:

1. A method in a driveline in a vehicle for controlling the distribution of drive torque to two drive wheels via a differential being provided with a differential brake with a hydraulically controlled limited slip clutch, comprising selecting predetermined driving situations of the vehicle that are predictive of a need for a shortened response time of the clutch, monitoring the predetermined driving situations, applying a low preparatory hydraulic pressure to the clutch at the occurrence of any one of the predetermined driving situations independent of completely engaging the clutch.

2. A method according to claim 1, wherein the preparatory hydraulic pressure is of a magnitude to bring clutch discs of the clutch in contact with each other but not to influence driving dynamics of the vehicle.

3. A method according to claim 1, wherein the applying the low preparatory hydraulic pressure is carried out in situations, where a controlling action of the clutch is envisaged shortly, when a need for initiating the controlling action has not yet occurred.

4. A method according to claim 3, wherein the preparatory hydraulic pressure is applied a certain time after the brake pedal of the vehicle is released.

5. A method according to claim 3, wherein the preparatory hydraulic pressure is applied, when the vehicle is accelerating while negotiating a sharp curve that generates a lateral acceleration that is indicative of a wheel of the vehicle to slip.

6. A method according to claim 3, wherein the preparatory hydraulic pressure is applied, when the steering wheel of the vehicle, running at high speed, is turned.

7. A driveline in a vehicle comprising a differential for distributing a drive torque to two drive wheels and a differential brake with a hydraulically controlled limited slip clutch comprising a response system for controlling the supply of a preparatory hydraulic pressure to the clutch at the occurrence of any one of certain predetermined driving situations, the response system includes a pump wherein a speed of the pump is varied to supply the preparatory hydraulic pressure to the clutch, wherein under the preparatory hydraulic pressure the clutch does not influence dynamics of the vehicle, and to supply a second hydraulic pressure to engage the clutch the second hydraulic pressure higher than the preparatory hydraulic pressure so that the dynamics of the vehicle are influenced.

8. A driveline according to claim 7 wherein the pump is connected to the clutch so that the preparatory hydraulic pressure and the second hydraulic pressure are supplied directly from the pump to the clutch through a connection that does not include a valve disposed in the connection between the pump and the clutch, and wherein the connection is not interruptible.

9. A driveline according to claim 8 wherein the preparatory hydraulic pressure and the second hydraulic pressure are supplied to the clutch solely directly from the pump.

10. A driveline according to claim 9 comprising an engine for propelling the vehicle, and a motor connected to the pump, the motor constantly running when the engine is running so that the pump constantly generates the preparatory hydraulic pressure or the second hydraulic pressure, including when the vehicle is at a standstill.

11. A method comprising providing a vehicle with a pair of half-axles, providing a clutch to control at least one of a speed distribution or a torque differential between the half-axles, providing a pump hydraulically connected to the clutch, supplying a preparatory hydraulic pressure to the clutch from the pump wherein the preparatory hydraulic pressure is insufficient to control the speed distribution or the torque differential, supplying a second hydraulic pressure to the clutch from the pump wherein the second hydraulic pressure is greater than the preparatory hydraulic pressure and is sufficient to engage the clutch to control the speed distribution or the torque differential, and supplying the preparatory hydraulic pressure independent of initiation of supplying the second hydraulic pressure.

12. A method according to claim 11 comprising connecting a motor to the pump, operating the motor at a first speed to supply the preparatory hydraulic pressure, and operating the motor at a second speed to supply the second pressure.

13. A method according to claim 11 comprising providing an engine, running the engine to operate the vehicle, connecting a motor to the pump, operating the motor continuously when the engine is running, which includes operating the motor at an idle speed wherein a pressure at the clutch is nil so that discs of the clutch are separated, operating the motor at a first speed to supply the preparatory hydraulic pressure, and operating the motor at a second speed to supply the second pressure.

14. A method according to claim 11 comprising predetermining driving situations that predict engagement of the clutch, monitoring the vehicle for an occurrence of any of the predetermined driving situations, supplying the preparatory hydraulic pressure to the clutch when a predetermined driving situation occurs, maintaining the predetermined hydraulic pressure for a set time period following the occurrence, relieving the preparatory hydraulic pressure when operation of the vehicle does not initiate engagement of the clutch by the second hydraulic pressure within the set time period.

15. A method according to claim 11 comprising supplying the preparatory hydraulic pressure when the vehicle initiates movement from a standstill.

16. A method according to claim 11 comprising monitoring the vehicle for an occurrence of operating conditions that predict a possible wheel slip, and supplying the preparatory hydraulic pressure when the operating conditions occur, even when the second hydraulic pressure is not supplied in response to the occurrence of the operating conditions.

17. A method according to claim 11 comprising monitoring the vehicle for an occurrence of operating conditions that predict a possible need for yaw-damping, and supplying the preparatory hydraulic pressure when the operating conditions occur, even when actual yaw damping through the clutch is not initiated.

18. A method according to claim 11 comprising connecting a motor to the pump, connecting the motor to the clutch through an uninterruptible conduit so that the outlet of the pump is always open to the clutch, connecting an engine to the pair of half-axles to propel the vehicle, running the motor whenever the vehicle is propelled by the engine, including when the vehicle is at a braked standstill.

19. A method according to claim 11 comprising providing the vehicle with a data bus, reading signals from the data bus, calculating a state of the vehicle from the signals, determining whether a driving situation of the vehicle predicts an engagement of the clutch, and engaging the clutch to a kiss-point by supplying the preparatory hydraulic pressure.

20. A method according to claim 11 comprising predetermining driving situations of the vehicle that are predictive of a need to engage the clutch, continuously calculating a state of the vehicle to determine when the state represents one of the driving situations, determining when operation of the vehicle requires engagement of the clutch through supplying the second hydraulic pressure, and supplying the preparatory hydraulic pressure when it is determined that the state represents one of the driving situations even if it is determined that operation of the vehicle doesn't currently require engagement of the clutch through the second hydraulic pressure.

* * * * *